(12) United States Patent
Dieringer

(10) Patent No.: US 7,203,525 B2
(45) Date of Patent: Apr. 10, 2007

(54) WIRELESS CONTROL OF HELMET-MOUNTED COMMUNICATIONS EQUIPMENT

(76) Inventor: Michael D. Dieringer, 7 Buggy Whip Dr., Rolling Hills, CA (US) 90274

( * ) Notice: Subject to any disclaimer, the term of this patent is extended or adjusted under 35 U.S.C. 154(b) by 0 days.

(21) Appl. No.: 11/270,975

(22) Filed: Nov. 10, 2005

(65) Prior Publication Data

US 2006/0194604 A1     Aug. 31, 2006

Related U.S. Application Data

(63) Continuation-in-part of application No. 11/066,032, filed on Feb. 25, 2005, now Pat. No. 7,062,301.

(51) Int. Cl.
*H04M 1/00* (2006.01)
(52) U.S. Cl. .................. 455/569.1; 455/90.2; 455/345
(58) Field of Classification Search ..................... None
See application file for complete search history.

(56) References Cited

U.S. PATENT DOCUMENTS

| | | |
|---|---|---|
| 5,790,947 A | 8/1998 | Dieringer |
| 6,015,160 A | 1/2000 | Spector |
| 6,225,584 B1 * | 5/2001 | Ase et al. ................ 200/61.54 |
| 6,311,052 B1 | 10/2001 | Lenz |
| 2003/0026440 A1 | 2/2003 | Lazzeroni et al. |
| 2004/0235429 A1 | 11/2004 | Garavaglia et al. |

* cited by examiner

*Primary Examiner*—Erika A. Gary
(74) *Attorney, Agent, or Firm*—Michael E. McKee

(57) ABSTRACT

A communication system for use by a helmeted rider of power sports equipment which enables the rider to control operating characteristics, such as the operating mode, of a microphone-including arrangement for a two-way radio or public address (PA) equipment while the rider maintains his grip about the handlebars of the power sports equipment for operation thereof. In addition, the microphone-including arrangement is supported entirely by the helmet of the rider, and the communication system does not involve any connecting wires which may otherwise extend between any components of the system which are carried by the rider and any components of the system which are carried by the power sports equipment.

22 Claims, 3 Drawing Sheets

WIRELESS CONTROL OF HELMET-MOUNTED COMMUNICATIONS EQUIPMENT

This invention is a continuation-in-part of application Ser. No. 11/066,032 (now U.S. Pat. No. 7,062,301), filed Feb. 25, 2005 and entitled WIRELESS CONTROL OF OPERATING CHARACTERISTICS OF MICROPHONE-INCLUDING ARRANGEMENT FOR USERS OF POWER SPORTS EQUIPMENT, the disclosure of which is incorporated herein by reference.

BACKGROUND OF THE INVENTION

This invention relates generally to means and methods for controlling various operating characteristics of a microphone-including arrangement for a radio system or a public address system by a user of either of such systems and relates, more particularly, to the means for controlling operating characteristics of such a microphone-including arrangement while the user operates power sports equipment, such as a motorcycle.

The class of radio and public address systems with which this invention is to be used includes those which are utilized by riders of power sports equipment, such as a motorcycle, in police, rescue or military environments. It is common, for example, that a motorcycle-riding policeman carries a portable (e.g. belt-mounted) two-way radio or has access to a two-way radio carried by the motorcycle for purposes of communicating with other police personnel. Similarly, in instances in which a public address (PA) system is mounted upon the power sports equipment, the rider may desire that messages spoken by him be broadcast over the loudspeaker of the PA system. For purposes of transmitting his voice messages over a radio or over a loudspeaker of a PA system, the rider typically utilizes a microphone-including arrangement which must commonly be switched between a talk mode (which enables voice messages from the rider to be transmitted from the microphone-including unit) and a non-talk mode.

Because safe operation of power sports equipment normally requires that both hands of the rider be positioned or gripped about a set of handlebars associated with the power sports equipment—wherein such operation may involve the steering, speed control and the braking of the power sports equipment, it is difficult for the rider of the power sports equipment to actuate switches carried upon his person (e.g. upon a belt-mounted radio) for switching the microphone-including unit between its talk mode and its non-talk (e.g. a listen) mode while he operates the power sports equipment.

In my co-pending U.S. patent application Ser. No. 11/066,032, referenced above, I describe a switching system which enables a motorcycle rider to transmit his voice over a helmet-mounted microphone to either a radio or a PA system associated with the motorcycle while the rider maintains his grip about the handlebars of the motorcycle. In this connection, necessary components of the system are carried by (i.e. mounted upon) the person of the rider for wirelessly transmitting or receiving signals (e.g. either voice-carrying signals or mode-switching signals) between the helmet-mounted microphone and the motorcycle radio or PA system. It follows that in order for a motorcycle rider to be appropriately equipped for using the switching system of my referenced application, all of the necessary components must be appropriately attached to the person of the rider. Of course, the attachment of the necessary components to the person of the rider can be time-consuming, and if any of these components are unavailable to the rider or forgotten to be attached, the system will not fully operate in its intended manner.

Accordingly, it is an object of the present invention to provide a new and improved system of the class described in my referenced patent application which obviates the need that a number of various components be attached to the person of the rider of power sports equipment in order for the system to be rendered wholly operational.

Another object of the present invention is to provide such a system having various components which are mounted within the helmet of the rider which have heretofore been attached to the person of the rider.

Still another object of the present invention is to provide such a system which is uncomplicated in structure, yet effective in operation.

SUMMARY OF THE INVENTION

This invention resides in a communication system for use by a helmeted rider of power sports equipment having handlebars about which the hands of the rider are positioned during operation of the power sports equipment and wherein the communication system includes a microphone-including arrangement to be carried by the rider and a manually-operable switch mounted upon the handlebars of the power sports equipment for controlling operating characteristics of the communication system as the hands of the rider remain positioned about the handlebars of the power sports equipment.

The improvement comprises a control unit which is mountable upon the power sports equipment and which is connectable to the manually-operable switch mountable upon the handlebars of the power sports equipment. In addition, the control unit and the microphone-including arrangement include means for wirelessly communicating with one another so that control of operating characteristics of the communication system can be had by way of the manually-operable switch mounted upon the handlebars of the power sports equipment without any need for wires connected between the microphone-including arrangement and the power sports equipment. Furthermore, the means for wirelessly communicating includes components which are carried by the microphone-including arrangement, and those components are supported by the helmet of the rider.

DETAILED DESCRIPTION OF THE ILLUSTRATED EMBODIMENTS

Figure 1:
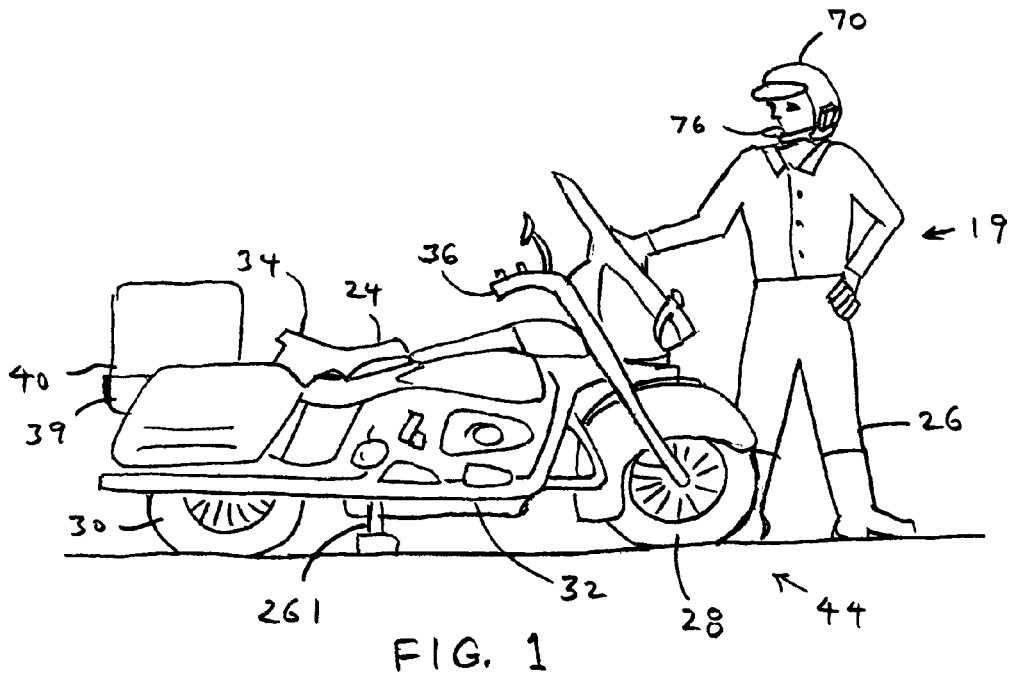
FIG. 1 is a side elevation view of a motorcycle-riding law enforcement officer, his motorcycle and various items of communication equipment within which features of the present invention are embodied.
Figure 2:
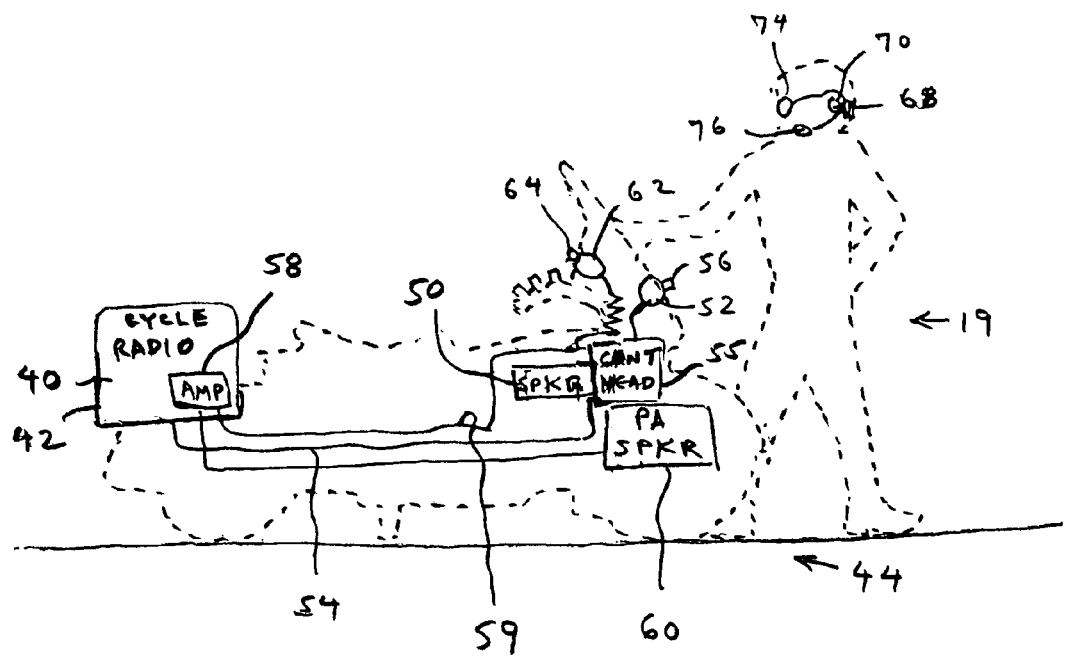
FIG. 2 is a view similar to that of FIG. 1 except that items of the FIG. 1 communication equipment carried by the officer and his motorcycle are more clearly identified against phantom-line outlines of the officer and his motorcycle.

Turning now to the drawings in greater detail and considering first FIGS. 1 and 2, there is illustrated a communication system, generally indicated 19, embodying features of the present invention and shown employed in an exemplary environment of intended use. More specifically, the environment of FIGS. 1 and 2 includes a motorcycle 24 and a motorcycle rider 26, such as a policeman, and the communication system 19 includes one set of components, described herein, which are attached to and carried by the motorcycle 24 and another set of components, described herein, which are attached to and carried by the rider 26 and, more specifically, are supported by a helmet 70 which is adapted to be worn by the rider 26.

Briefly, the motorcycle 24 includes a frame, front and rear wheels 28 and 30, respectively, an engine 32 supported between the front and rear wheels 28 and 30, a seat 34 for the rider 26, and a set of handlebars 36 adapted to be gripped by the hands of the rider 26 during operation of the motorcycle 24. As is the case with many motorcycles, there is mounted upon the handlebars 36 various hand-operated controls for controlling the operation (e.g. speed and braking) of the motorcycle 24 while the rider's hands remain gripped about the handlebars 36.

The motorcycle 24, as well as the rider 26, carries items, described herein, of communication equipment which cooperate with the communication system 19 during operation of the system 19. More particularly and as best shown in FIG. 2, items of such communication equipment carried by the depicted motorcycle 24 includes a two-way radio 40 and a public address (PA) system or equipment, generally indicated 44 each of which is well known in the art. The two-way radio 40 includes a body 42 which is supported in a radio-carrying box 39 mounted above the rear wheel 30, and the principle components of the PA equipment 44 (commonly incorporated within a combination Siren/PA amplifier system) are also typically mounted in the radio-carrying box 39 above the rear wheel 30.

The operation and construction of the motorcycle-carried two-way radio 40 are well known in that its body 42 includes means for receiving wireless voice-carrying signals transmitted from a remote source, such as from a police station or from the radio equipment of another policeman, and also includes a speaker 50 mounted, for example, adjacent the motorcycle handlebars 36 for emitting audible sounds (e.g. voice messages) corresponding to the voice-carrying signals received by the radio 40. In other words, the radio speaker 50 enables messages received by the radio 40 to be heard by the rider 26. In addition, the radio 40 further includes a microphone 52 situated, for example, adjacent the handlebars 36 of the motorcycle 24 and which is connected to the body 42 of the radio 40 by way of a control head 55 mounted adjacent the front of the motorcycle 24 and a cable 54. Within the depicted motorcycle 24, the control head 55 includes appropriate inlet ports into which components, such as the microphone 52 and speaker 50 (or more specifically, the cable 54), are plugged. Voice messages which originate from the rider 26 and are transmitted through the microphone 52 to the body 42 of the radio 40 are subsequently transmitted wirelessly from the radio body 42 to a remote site, such as to a police station or to another policeman.

The motorcycle-carried radio 40 is adapted to be manually switched between a talk mode during which voice messages spoken by the rider 26 into the microphone 52 are broadcasted from the radio body 42 and a non-talk, or listen, mode during which the wireless voice-carrying signals which are received by the radio body 42 are conducted to the radio speaker 50 where they are emitted in the form of audible voice messages for the rider to hear. Normally, the radio 40 is in the non-talk, or listen, mode but its operating mode can be changed from the non-talk mode to a talk mode by depressing a push-to-talk (PTT) switch 56 mounted upon the side of the microphone 52. Therefore, by depressing the PTT switch 56, the radio 40 changes from its normal, non-talk mode to its talk mode enabling the rider 26 to wirelessly transmit voice messages which are spoken by the rider 26 into the radio microphone 52 from the radio body 42. Upon release of the PTT switch 56, the motorcycle-carried radio 40 reverts to its non-talk mode. As will be apparent herein, the embodiment of the communication system 19 of the present invention includes a microphone-including unit, described herein, which provides the rider 26 with the option of using either the radio microphone 52 or the microphone-including unit for transmitting rider-spoken messages to the body 42 of the motorcycle-carried radio 40 for broadcast therefrom.

For purposes which will be also apparent herein, the motorcycle-carried radio 40 also includes a number of access ports, such as an "accessory" port, into which a component of the system 19, described herein, can be plugged for purposes of providing alternatives (e.g. talk, listen, PTT signals) to the motorcycle-carried radio 40.

The public address (PA) equipment 44 carried by the motorcycle 24 includes an amplifier 58 mounted within the radio-carrying box 39 and an associated loudspeaker 60 mounted, for example, adjacent the handlebars 36 and a microphone 62 which is connected to the amplifier unit 58 by way of a cable 59. The PA equipment 44 can be activated through an appropriate switch 64 (i.e. a push-to-talk switch) mounted on the side of the microphone 62 and which is depressed by the rider 26 when the rider desires to transmit his voice over the PA loudspeaker 60. As will be apparent herein, the communication system 19 described herein provides the rider 26 with the option of using either the PA microphone 62 or a microphone-including unit of the communication system 19 for transmitting his voice messages over the PA loudspeaker 60.

Figure 3:
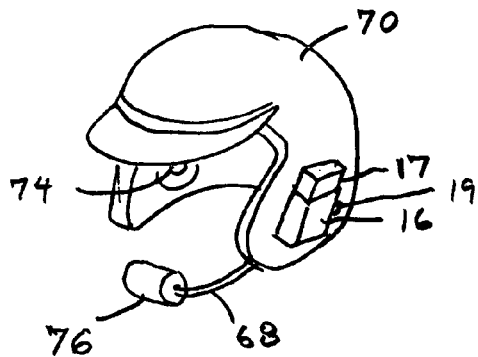
FIG. 3 is a perspective view which illustrates schematically various items of the communication equipment carried by the helmet of the officer of FIG. 1.
Figure 4:
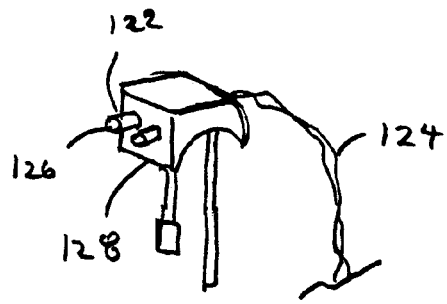
FIG. 4 is a view similar to that of FIG. 3 except that items of the FIG. 1 communication equipment carried by the officer are more clearly identified against a phantom-line outline of the officer's helmet.
Figure 4:
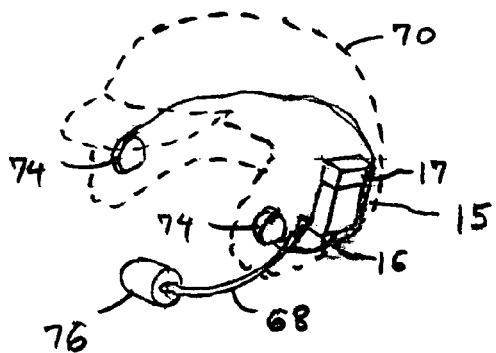

With reference to FIGS. 2–4, the communication equipment carried by the rider 26 includes a microphone-including unit which, in the depicted example, is in the form of a communications assembly 68 adapted to be supported by the helmet 70 to be worn by the rider 26. In this connection, the helmet-mounted communications assembly 68 includes two (e.g. a left and a right) earphones 74 which are adapted to be mounted within (with, for example, Velcro®) the interior of the helmet 70 and positioned in registry with the ears of the rider 26 when the helmet 70 is worn and a microphone 76. The microphone 76 is attached to the helmet 70 so that the microphone 76 is supported adjacent, or in front of, the mouth of the rider 26 when the helmet 70 is worn so that voice messages which are spoken by the rider 26 are picked up by the microphone 76.

There is also associated with the helmet-mounted communications assembly 68 a transceiver unit 16 which is mounted upon one side of the helmet 70 and appropriately wired to the earphones 74 for sending electrical signals thereto and to the microphone 76 for accepting electrical signals conducted therefrom. To this end, the transceiver unit 16 includes ports into which cables which lead from the left and right earphones 74 and the microphone 76 are plugged. As will be apparent herein, this transceiver unit 16 is adapted to wirelessly send voice-carrying signals which are spoken into the microphone 76 by the rider 26 to either the motorcycle radio 40 for transmission to a remote site, such as a police station or to the radio equipment or another policeman, or to the motorcycle-mounted PA equipment 44 for broadcast therefrom and to wirelessly receive voice-carrying signals which are received by the motorcycle radio 40 from a remote source. When the voice-carrying signals are received by the transceiver unit 16 from the radio 40, the signals are conducted to the earphones 74 where they are heard by the rider 26 as audible messages.

Figure 6:
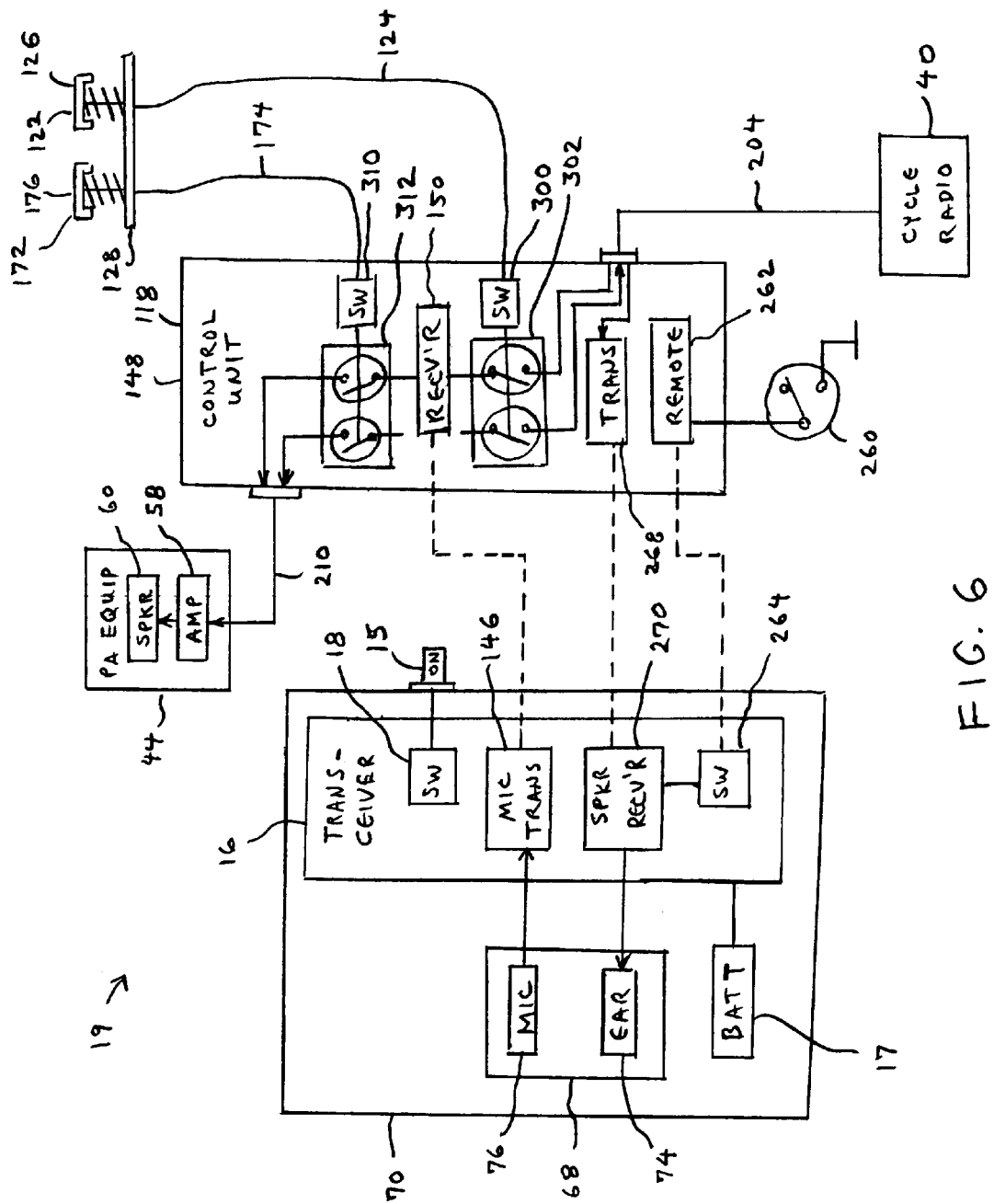
FIG. 6 schematically illustrates in block diagram form the operation of an embodiment of the FIG. 1 communication equipment when used to transmit voice messages of the officer over either the motorcycle-carried two-way radio or over the PA system carried by the FIG. 1 motorcycle and when used to receive voice-carrying signals from the two-way radio and present them to to the helmet-mounted earphones.

With reference to FIG. 6, the transceiver unit 16 includes a transmitter 146 to which voice-carrying signals are conducted from the helmet microphone 76 for wireless transmission from the communications assembly 68 to, for example, the motorcycle radio 40 or to the PA equipment 44 for broadcast from the loudspeaker 60 thereof. In addition, the transceiver unit 16 includes a receiver 270 for receiving voice-carrying signals which are wirelessly transmitted from the radio 40 to the communications assembly 68 for conductance of those signals to the earphones 74 of the communications assembly 68.

The transceiver unit 16 is powered by a battery 17 which is mounted upon the side of the helmet 70 adjacent the transceiver unit 16, and there is wired into the circuit of the transceiver unit 16 a switch mechanism 18 for energizing the transceiver unit 16 from the battery 17 or cutting off the power from the battery 17. The switch mechanism 18 is manually actuated by way of a two-position ON/OFF switch 15 mounted upon the side of the transceiver unit 16. Therefore, when it is desired to activate the communications assembly 68 and thus activate the components thereof, the rider 26 simply shifts the two-position ON/OFF switch 15 to its ON position. Conversely and in order to de-activate the assembly 68 (and thus conserve battery energy), the rider 26 shifts the two-position ON/OFF switch 15 to its OFF position.

Figure 5:
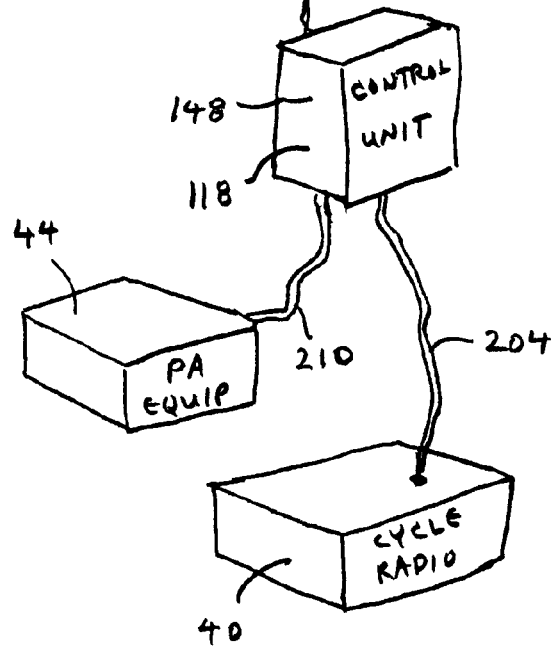
FIG. 5 is a perspective view which illustrates schematically various items of the communication equipment mounted upon the motorcycle of FIG. 1.

To enable communication between the helmet-mounted communication assembly 68 with the motorcycle radio 40 or to the PA equipment 44, the communication system embodiment 19 includes a control unit 148 (FIGS. 5 and 6) which is connected to the radio 40 by way of a cable 204 and which is connected to the PA equipment 44 by way of a cable 210. The control unit 148 includes a body 118 mounted adjacent the front of the motorcycle 24 and beneath the motorcycle windshield, and there is mounted within the body 118 a receiver 150 and a transmitter 268 with which wireless signals are sent to and received from the transceiver unit 16. Furthermore, the control unit 148 includes a switch 300 and an associated (normally-open) switch mechanism 302 which is associated with the receiver 150 for routing, upon receipt of a switching signal generated for that purpose, the voice-carrying signals which are received by the receiver 150 from the transceiver unit 16 of the helmet-mounted communication assembly 68.

The switch mechanism 302 is illustrated in the FIG. 6 embodiment 19 as including dual switch devices so that when the switch 300 is actuated, two functions are effected, i.e. the motorcycle-carried radio 40 is switched to a talk mode of operation and the voice-carrying signals which are received by the receiver 150 (from the transmitter 146 of the transceiver unit 16) are conducted to the radio 40 for transmission therefrom. It will be understood, however, that until the radio 40 is switched to a talk mode of operation, the radio remains in a non-talk, or listen, mode, and thus in condition for receiving voice-carrying signals broadcast thereto from a remote site. Upon receipt of the voice-carrying signals by the radio 40 from a remote site, the signals are wirelessly transmitted from the transmitter 268 to the transceiver unit 16 and conducted to the earphones 74 of the communications assembly 68 where they are heard by the rider 26 as audible messages. It follows therefore that unless and until the switch 300 is actuated, the radio 40 is in the non-talk, or listen, mode so that any voice-carrying messages which are received by the radio 40 from a remote site and intended to be heard by the rider 26 are wirelessly transmitted to the transceiver unit 16 mounted upon the rider's helmet 70.

For purposes of actuating the switch 300, and consequently the switching mechanism 302, a manually-operable PTT switch 122 is mounted upon the handlebars 36 of the motorcycle 24 and is wired to the switch 300 of the control unit 148 by way of a cable 124. The PTT switch 122 includes a depressible switch button 126 which is supported within a bracket 128 (with which the switch 122 is attached to the handlebars 36) and is spring-biased from a depressed condition relative to the bracket 128 to an extended condition relative thereto. Furthermore, the bracket 128 is attachable to the handlebars 36 so that the rider 26 can actuate (i.e. depress) the switch button 126 with one of his hands (i.e. his thumb) while the rider 26 maintains his grip about the motorcycle handlebars 36 during operation of the motorcycle 24.

It follows that while the rider 26 is on or beside his motorcycle 24 with his helmet-mounted communications assembly 68 switched ON and he wishes to transmit a voice message through the motorcycle-carried radio 40 to a remote site, he must initially depress the button 126 of the PTT switch 122 mounted upon the handlebars 36 and then speak into the microphone 76 of the helmet-mounted communications assembly 68. By depressing the PTT switch button 126, the switch 300 is actuated so that the (normally-open) switch mechanism 302 closes so that the radio 40 is switched to a talk mode and so that voice-carrying signals which are received by the receiver 150 from the transceiver unit transmitter 146 are conducted to the motorcycle-carried radio 40 by way of the cable 204 for transmission from the radio 40 to a remote site.

It also follows that as long as the button 126 of the PTT switch 122 remains depressed by the rider 26 during this set of circumstances (thereby keeping the embodiment 19 in a talk mode), any voice message that he speaks into the microphone 76 of the helmet-mounted communications assembly 68 is conducted (in the form of voice-carrying signals) from the microphone 76 and into the transceiver unit 16 from which they are wirelessly transmitted (by way of the transmitter 146) to the control unit 148. These wirelessly-transmitted voice-carrying signals are picked up by the receiver 150 of the control unit 148 and then conducted to the radio 40 from which they are broadcast to a remote site.

If the rider 26 were to depend upon the helmet-mounted communication assembly 68 to transmit voice messages spoken into his microphone 76 to the motorcycle radio 40 as he walks away from his motorcycle 24, he would discover that the strength of a wireless transmission from the control unit 148 to the communications assembly 68 (speaker audio) is reduced the further from the motorcycle 24 he moves. Consequently and to ensure that the rider 24 must change to another means of communicating, such as to a belt-worn portable radio (not shown) when the rider 24 moves away from the motorcycle 24, the communication system embodiment 19 includes means for enabling the receiver 270 of the transceiver unit 16 only under circumstances when the motorcycle 24 is in a condition to be ridden (or, in other words, when its kickstand is up).

To this end and with reference still to FIG. 6, the communication system embodiment 19 includes a sensor, or switch 260, associated with the motorcycle kickstand, indicated 261 in FIG. 1, for sensing a non-vertical condition of the kickstand 261 and which is connected to a remote controller 262 (FIG. 6) mounted within the control unit 148. As is commonly the case with kickstands, the kickstand 261 is adapted to support the motorcycle 24 in an upright position when the motorcycle 24 is not in operation and is pivotally connected to the body of the motorcycle 24 for movement between a substantially vertical condition for supporting the motorcycle 24 in an upright position and a non-vertical condition for storage of the kickstand 261. Meanwhile, the communication assembly 68 includes an electronic switch 264 (incorporated within the transceiver unit 16) for switching, upon receipt of a wireless signal from the remote controller 262, the speaker receiver 270 ON or, in other words, from a dormant, inactive state to an enabled state.

By pivotally moving the motorcycle kickstand 261 from a substantially vertical condition (which would indicate that the rider has stopped and that the rider 26 has dismounted) to a non-vertical condition (which would evidence that the rider 26 is on or at the motorcycle 24), the kickstand switch 260 senses the non-vertical condition of the kickstand 261 and initiates, by way of the remote controller 262, a triggering of the electronic switch 264 so that the speaker receiver 270 is switched ON. With the receiver 270 enabled, the earphones 74 will receive audio from the radio 40. It also follows that until the motorcycle kickstand 261 is returned to a substantially vertical condition from the non-vertical condition, the speaker receiver 270 will remain operational.

Conversely, when the kickstand 261 is moved to its vertical condition, the kickstand switch 260 senses that condition of the kickstand 261 so that the remote controller 262 ceases to send a signal to the switch 264 so that the speaker receiver 270 becomes disabled. With the speaker receiver 270 disabled, the rider 26 must use a means of communication, other than the communications assembly 68, to send and receive wireless communications.

As mentioned earlier, the embodiment 19 of the communication system can be employed for transmitting voice messages which originate from the rider 26 to the PA equipment 44 for broadcast from the loudspeaker 60 thereof. More specifically, the embodiment 19 can be utilized to wirelessly transmit voice-carrying signals from the microphone 76 of the helmet-mounted communications assembly 68 to the motorcycle-mounted PA equipment 44.

In this connection, a switch 310 is mounted within the control unit 148 and an associated (normally-open) switch mechanism 312 is wired in-line between the receiver 150 of the FIG. 6 embodiment 19 and the PA equipment 44. The switch mechanism 312 of the depicted embodiment 19 of FIG. 6 includes a dual switching device so that when the switch 310 is actuated, two functions are effected, i.e. the PA equipment 44 is switched to a talk mode and the voice-carrying signals which are received by the receiver 150 of the embodiment 19 (from the transmitter 146 of the transceiver unit 16) are routed to the PA equipment 44 for broadcast from the loudspeaker 60 thereof.

To enable the user (i.e. rider 26) of the communication embodiment 19 to utilize the PA equipment 44 while maintaining his grip upon the handlebars 36, another manually-operable PTT switch 172 is mounted upon the handlebars 36 of the motorcycle 24 (alongside the PTT switch 122) and wired to the internal switch 310 of the control unit 148 by way of a cable 174. The PTT switch 172 includes a depressible switch button 176 which is housed within the bracket 128 (with which the switches 122 and 172 are attached to the handlebars 36) and is spring-biased from a depressed condition relative to the bracket 128 to an extended condition relative thereto. With the switch button 176 of the PTT switch 172 mounted alongside the switch button 126 of the PTT switch 122, the rider 26 can actuate (i.e. depress) either of the switch buttons 126 or 176 with one of his hands (i.e. his thumb) while he maintains his grip about the motorcycle handlebars 36 during operation of the motorcycle 24.

Upon depression of the switch button 176 of the PTT switch 172, the internal switch 310 is manually actuated so that the (normally-open) switching mechanism 312 closes thereby routing voice-carrying signals which are received by the receiver 150 of the embodiment 19 from the unit transmitter 146 to the PA equipment 44 by way of the cable 210 for broadcast from the loudspeaker 60 thereof.

Therefore, to use the PA equipment 44 of the FIG. 6 embodiment 19 while the rider 26 maintains his grip about the motorcycle handlebars 36, the rider 26 can depress the switch button 176 of the PTT switch 172 while he speaks into the microphone 76 of his helmet-mounted communications assembly 68. Therefore, as long as the switch button 176 of the PTT switch 172 is depressed, the communication system embodiment 19 is in a PA talk mode so that voice messages which are spoken into the communications assembly microphone 76 are ultimately broadcast over the PA loudspeaker 60 in the form of audible voice messages.

It follows from the foregoing that a communication system 19 has been described for use by a rider 26 of power sports equipment (e.g. a motorcycle 24) having handlebars 36 about which the hands of the rider 26 are gripped during operation of the power sports equipment. Such a communication system 19 includes a microphone-including arrangement in the form of a communication assembly 68 which is mounted within (or upon) the rider's helmet 70 for receiving (when the radio 40 is in a non-talk mode) wireless voice-carrying signals which are transmitted thereto from the radio 40 and for conducting those signals to the earphones 74 where they are heard by the rider 26 as audible messages. Furthermore, the communications assembly 68 is adapted to wirelessly transmit (when the radio 40 is in a talk mode) voice-carrying signals which are, in turn, received by a control unit 148 for conductance to a motorcycle-carried radio 40 for transmission therefrom or to the loudspeaker 60 of PA equipment 44 for broadcast therefrom. Further still, the operating characteristics of the communication system (e.g. the talk versus the non-talk mode of operation) can be had by way of a manually-operable switch mounted upon the handlebars of the power sports equipment without any need for cables or wires connected between the microphone-including arrangement and the control unit, or more specifically, the power sports equipment.

Because the communication system 19 described herein does not require that any cable or wire be connected between the rider and the power sports equipment, the rider can, if he desires, climb onto or off of his power sports equipment and move away from the power sports equipment without having to remember to connect or disconnect any of the radio or PA communication equipment being carried upon his person to appropriate hook-ups associated with the power sports equipment. Consequently, the communication system described herein eliminates the chance that the rider will walk away from his vehicle and be either jerked back toward the power sports equipment or become entangled within wires or cables which may otherwise join the rider to the power sports equipment.

It also follows that the communication system 19 is well-suited for use by law enforcement or rescue personnel who are expected to operate a radio or PA equipment as the personnel rides a motorcycle or other power sports equipment, such as an all-terrain vehicle (ATV) or a snowmobile. Accordingly, the principles of the present invention can be applied to any of a number of environments.

It will be understood that numerous modifications and substitutions can be had to the aforedescribed embodiments without departing from the spirit of the invention. For example, each of the communications assembly 68, the control unit 148 and bracket-mounted PTT switches 122 and 172 of the aforedescribed embodiment 19 can all be equipped with or accompanied by an LED which is energized when the power to the corresponding component is switched ON. Such LEDs would visually inform the rider 26 as to whether each of the aforementioned components of the communication system embodiment 19 is prepared for operation.

Further, although the communications assembly components, including the earphones 74, microphone 76, battery 17 and transceiver unit 16, have been shown and described as being mounted within or upon the interior of the helmet 70, these components can be mounted at alternative places upon or within the helmet 70, and still be supported by the helmet 70. Accordingly, the aforedescribed embodiment 19 is intended for the purpose of illustration and not as limitation.

The invention claimed is:

1. In a communication system for use by a helmeted rider of power sports equipment having handlebars about which the hands of the rider are positioned during operation of the power sports equipment and wherein the communication system includes a microphone-including arrangement to be carried by the rider and a manually-operable switch mounted upon the handlebars of the power sports equipment for controlling operating characteristics of the communication system as the hands of the rider remain positioned about the handlebars of the power sports equipment wherein the microphone-including arrangement includes a helmet-mounted microphone into which voice messages which are spoken by the rider are wirelessly transmitted in the form of voice-carrying signals and wherein there is mounted upon the power sports eguipment at least one of a two-way radio for wireless transmission of voice-carrying signals to a remote site and public address (PA) eguipment for broadcast of voice-carrying signals in the form of audible messages, the improvement comprising:

a control unit mountable upon the power sports equipment and connectable to the manually-operable switch mountable upon the handlebars of the power sports equipment and to the at least one of the two-way radio and the PA eguipment mounted upon the power sports eguipment, and the control unit is adapted to receive the voice-carrying signals from the helmet-mounted microphone for conductance to the two-way radio for transmission to a remote site or for conductance to the PA equipment for broadcast in the form of audible messages;

the control unit and the microphone-including arrangement including means for wirelessly communicating with one another so that control of operating characteristics of the communication system can be had by way of the manually-operable switch mounted upon the handlebars of the power sports equipment without any need for wires connected between the microphone-including arrangement and the power sports equipment, the means for wirelessly communicating is comprised of a first set of components which is associated with the microphone-including arrangement and a second set of components which is associated with the control unit; and the entirety of said first set of components of the means for wirelessly-communicating is supported by the helmet of the rider so that no wires extend between the helmet of the rider and the person of the rider to effect communication between the microphone-including arrangement and the control unit and so that removal of the helmet from the rider does not require the disconnection of any helmet-carried component from the person of the rider.

2. The improvement as defined in claim 1 wherein the manually-operable switch includes a switch mechanism which is movable between first and second positions of movement, and the manually-operable switch is connected to the control unit so that movement of the switch mechanism from the first position to the second position renders the control unit in condition for receiving voice messages which are spoken into the microphone of the microphone-including arrangement and are subsequently transmitted wirelessly from the microphone-including arrangement.

3. The improvement as defined in claim 2 wherein the control unit includes a transceiver for receiving voice-carrying signals, and the first set of components of the means for wirelessly communicating includes a transceiver for transmitting the voice-carrying signals from the microphone of the microphone-including arrangement to the transceiver of the control unit.

4. The improvement as defined in claim 1 wherein the manually-operable switch mounted upon the handlebars is cooperable with the control unit so that by actuating the manually-operable switch, the voice-carrying signals received by the receiving means are conducted to the one of the two-way radio or PA equipment for transmission or broadcast therefrom.

5. The improvement as defined in claim 4 wherein there is associated with the power sports equipment a two-way radio for receiving voice-carrying signals which are transmitted to the two-way radio from a remote source;

the control unit is connectable to the two-way radio for receiving the voice-carrying signals received thereby from a remote source and includes means for wirelessly transmitting the received voice-carrying signals from the control unit; and the first set of components includes means for receiving the voice-carrying signals transmitted wirelessly from the control unit and the microphone-including arrangement includes at least one earphone through which the voice-carrying signals which are received by the first set of components are emitted in the form of audible messages.

6. The improvement as defined in claim 5 further comprising an electronic switch associated with the microphone-including arrangement for enabling the signal-receiving [signal-transmitting] capacity of the microphone-including arrangement from a disabled condition upon receipt of a wireless switching signal; and the control unit includes means for sending a wireless switching signal to the electronic switch associated with the microphone-including arrangement upon the occurrence of a predetermined event.

7. The improvement as defined in claim 6 wherein the power sports equipment includes a kickstand for supporting the power sports equipment when the power sports equipment is not in operation and is pivotally movable relative to the remainder of the power sports equipment between a substantially vertical condition for supporting the power sports equipment as aforesaid and a non-vertical condition for storage of the kickstand, and the improvement further includes a switch associated with the kickstand which is adapted to sense the existence of a substantially non-vertical condition of the kickstand and is connected to the wireless switching signal-sending means of the control unit for sending a wireless switching signal to the electronic switch associated with the microphone-including arrangement when the kickstand is arranged in its substantially non-vertical condition.

8. A communication system for use by a helmeted rider of power sports equipment having handlebars about which the hands of the rider are positioned during operation of the power sports equipment, the system comprising:

at least one of a two-way radio for wireless transmission of voice-carrying signals to a remote site and public address (PA) eguipment for broadcast of voice-carrying signals in the form of audible messages and wherein the at least one of a two-way radio and PA eguipment being mounted upon the power sports eguipment for movement therewith;

a microphone-including arrangement supported by the helmet of the rider for emitting voice-carrying signals, the microphone-including arrangement being operable in a talk mode during which voice messages spoken by the rider are received by the microphone of the microphone-including arrangement and transmitted from the microphone in the form of voice-carrying signals and a non-talk mode;

a control unit mountable upon the power sports eguipment including means for receiving the voice-carrying signals transmitted from the microphone-including arrangement and being connectable to the at least one of the two-way radio and the PA equipment for conductance of the voice-carrying signals received from the microphone-including arrangement to the at least one of the two-way radio and the PA eguipment for transmission to a remote site or for conductance to the PA eguipment for broadcast in the form of audible messages; and the control unit and the microphone-including arrangement including means for wirelessly communicating with one another wherein the means for wirelessly communicating is comprised of a first set of components which is associated with the microphone-including arrangement and a second set of components which is associated with the control unit;

the first set of components of the means for wirelessly communicating being adapted to receive voice messages which are spoken by the rider into the microphone of the microphone-including arrangement to wirelessly transmit the voice messages in the form of voice-carrying signals and the microphone-including arrangement being operable in a talk mode during which messages which are spoken by the rider into the microphone of the microphone-including arrangement are wirelessly transmitted by the first set of components from the microphone-including arrangement and a non-talk mode;

the second set of components of the means for wirelessly communicating including means for capturing the voice-carrying signals which are transmitted wirelessly from the microphone-including arrangement during the talk mode of operation of the microphone-including arrangement;

a manually-operable switch being mountable upon the handlebars of the power sports equipment and connected to the control unit so that the rider can switch the microphone-including arrangement between the talk and the non-talk modes by way of the control unit as the rider's hands remain positioned about the handlebars of the power sports equipment; and the entirety of the first set of components of the means for wirelessly communicating is supported by the helmet of the rider so that no wires extend between the helmet of the rider and the person of the rider to effect communication between the microphone-including arrangement and the control unit and so that removal of the helmet from the rider does not require the disconnection of any helmet-carried component from the person of the rider.

9. The system as defined in claim 8 wherein the manually-operable switch includes a switch button which is supported for movement between an extended condition and a depressed condition and which is spring-biased from the depressed condition toward the extended condition so that the manually-operable switch is actuated upon movement of the switch button from the extended condition to the depressed condition.

10. The system as defined in claim 8 wherein there is carried by the power sports equipment a two-way radio to which voice-carrying signals which are transmitted from the microphone-including arrangement are desired to be delivered for transmission therefrom;

the control unit includes a receiver for receiving the voice-carrying signals transmitted wirelessly from the microphone-including arrangement; and the receiver of the control unit is connectable to the two-way radio for conducting the voice-carrying signals which are received by the receiver of the control unit to the two-way radio for transmission therefrom.

11. The system as defined in claim 8 wherein there is associated with the power sports equipment public address (PA) equipment including a loudspeaker to which voice-carrying signals transmitted from the microphone-including arrangement are desired to be conducted for broadcast therefrom;

the control unit includes a receiver for receiving the voice-carrying signals transmitted wirelessly from the microphone-including arrangement; and the receiver is connectable to the PA equipment for conducting the voice-carrying signals which are received by the receiver of the control unit to the PA equipment for broadcast from the loudspeaker thereof.

12. The system as defined in claim 8 wherein there is carried by the power sports equipment both a two-way radio to which voice-carrying signals transmitted from the microphone-including arrangement can be delivered for transmission therefrom and public address (PA) equipment including a loudspeaker to which voice-carrying signals transmitted from the microphone-including arrangement can be delivered for broadcast from the loudspeaker thereof;

the control unit includes a receiver for receiving the voice-carrying signals transmitted wirelessly from the microphone-including arrangement;

the receiver of the control unit is connectable to the two-way radio;

the manually-operable switch is a first switch and is connected to the control unit so that upon actuation of the first switch, the voice-carrying signals which are received by the receiver of the control unit are conducted to the two-way radio for transmission therefrom;

the receiver of the control unit is connectable to the PA equipment; and the system further includes a second manually-operable switch being mountable upon the handlebars of the power sports equipment and connected to the control unit so that upon actuation of the second switch, the voice-carrying signals which are received by the receiver of the control unit are conducted to the PA equipment for broadcast from the loudspeaker thereof.

13. A communication system for use by a helmeted rider of power sports equipment having handlebars about which the hands of the rider are positioned during operation of the power sports equipment and there is associated with the power sports equipment at least one of a two-way radio or public address (PA) equipment to which voice-carrying signals are desired to be conducted for transmission or broadcast therefrom, the system comprising:

a microphone-including arrangement supported by the helmet of the rider for emitting voice-carrying signals, the microphone-including arrangement being operable in a talk mode during which voice messages which are spoken by the rider are received by the microphone of the microphone-including arrangement and are transmitted from the microphone in the form of voice-carrying signals, and the microphone-including arrangement includes means for wirelessly transmitting the voice-carrying signals from the microphone-including arrangement; and a control unit mountable upon the power sports equipment and including means for receiving the voice-carrying signals transmitted wirelessly from the microphone-including arrangement, and the receiving means of the control unit is connectable to one of the two-way radio or PA equipment for conductance thereto of the voice-carrying signals which are received by the receiving means of the control unit; and the control unit and the microphone-including arrangement including means for wirelessly communicating with one another wherein the means for wirelessly communicating is comprised of a first set of components which is associated with the microphone-including arrangement and a second set of components which is associated with the control unit;

the first set of components of the means for wirelessly communicating being adapted to receive voice messages which are spoken by the rider into the microphone of the microphone-including arrangement and to wirelessly transmit the voice messages from the microphone-including arrangement in the form of voice-carrying signals;

the second set of components of the means for wirelessly communicating including means for receiving the voice-carrying signals transmitted wirelessly from the microphone-including arrangement, and the receiving means of the control unit is connectable to one of the two-way radio or PA eguipment for conductance thereto of the voice-carrying signals which are received by the receiving means of the second set of components;

a manually-operable switch mounted upon the handlebars and connected to the control unit so that by actuating the manually-operable switch, the voice-carrying signals received by the receiving means of the second set of components of the means for wirelessly communicating are conducted to one of the two-way radio or PA equipment for transmission or broadcast therefrom; and the entirety of the first set of components of the means for wirelessly communicating is supported by the helmet of the rider so that no wires extend between the helmet of the rider and the person of the rider to effect communication between the microphone-including arrangement and the control unit and so that removal of the helmet from the rider does not require the disconnection of any helmet-carried component from the person of the rider.

14. The system as defined in claim 13 wherein there is associated with the power sports equipment a two-way radio for receiving voice-carrying signals which are transmitted to the radio from a remote source;

the control unit is connectable to the two-way radio for receiving the voice-carrying signals received thereby and includes means for wirelessly transmitting the received voice-carrying signals;

the microphone-including arrangement including a receiver for receiving the voice-carrying signals transmitted from the control unit; and the microphone-including arrangement further includes an electronic switch for enabling the receiver of the microphone-including arrangement from a disabled condition upon receipt of a wireless switching signal; and the control means include means for sending a wireless switching signal to the electronic switch of the microphone-including arrangement upon the occurrence of a predetermined event.

15. The system as defined in claim 14 wherein the power sports equipment includes a kickstand for supporting the power sports equipment when the power sports equipment is not in operation and is pivotally movable relative to the remainder of the power sports equipment between a substantially vertical condition for supporting the power sports equipment as aforesaid and a non-vertical condition for storage of the kickstand, and the system further includes a switch associated with the kickstand which is adapted to sense the existence of a substantially non-vertical condition of the kickstand and is connected to the wireless switching signal-sending means of the control unit for sending a wireless switching signal to the electronic switch of the microphone-including arrangement when the kickstand is arranged in its substantially non-vertical condition.

16. The system as defined in claim 13 wherein there is carried by the power sports equipment both a two-way radio to which voice-carrying signals transmitted from the microphone-including arrangement can be delivered for transmission therefrom and public address (PA) equipment including a loudspeaker to which voice-carrying signals transmitted from the microphone-including arrangement can be delivered for broadcast from the loudspeaker thereof;

the control unit includes a receiver for receiving the voice-carrying signals transmitted wirelessly from the microphone-including arrangement;

the receiver of the control unit is connectable to the two-way radio;

the manually-operable switch is a first switch and is connected to the control unit so that upon actuation of the first switch, the voice-carrying signals which are received by the receiver of the control unit are conducted to the two-way radio for transmission therefrom;

the receiver of the control unit is connectable to the PA equipment; and the system further includes a second manually-operable switch being mountable upon the handlebars of the power sports equipment and connected to the control unit so that upon actuation of the second switch, the voice-carrying signals which are received by the receiver of the control unit are conducted to the PA equipment for broadcast from the loudspeaker thereof.

17. The system as defined in claim 16 wherein each of the first and second manually-operable switches includes a switch button which is supported for movement between an extended condition and a depressed condition and which is spring-biased from the depressed condition toward the extended condition so that either of the first or second manually-operable switches is actuated upon movement of its switch button from the extended condition to the depressed condition.

18. In a communication system for use by a helmeted rider of power sports equipment having handlebars about which the hands of the rider are positioned during operation of the power sports equipment and wherein the communication system includes a microphone-including arrangement to be carried by the rider and a manually-operable switch mounted upon the handlebars of the power sports equipment for controlling operating characteristics of the communication system as the hands of the rider remain positioned about the handlebars of the power sports equipment, wherein there is associated with the power sports equipment at least one of a two-way radio or public address (PA) equipment to which voice-carrying signals are desired to be conducted for transmission or broadcast therefrom, and wherein the power sports equipment includes a kickstand for supporting the power sports equipment when the power sports equipment is not in operation and is pivotally movable relative to the remainder of the power sports equipment between a substantially vertical condition for supporting the power sports equipment as aforesaid and a non-vertical condition for storage of the kickstand, the improvement comprising:

a control unit mountable upon the power sports equipment and connectable to the manually-operable switch mountable upon the handlebars of the power sports equipment;

the control unit and the microphone-including arrangement including means for wirelessly communicating with one another so that control of operating characteristics of the communication system can be had by way of the manually-operable switch mounted upon the handlebars of the power sports equipment without any need for wires connected between the microphone-including arrangement and the power sports equipment, the means for wirelessly communicating including components which are carried by the microphone-including arrangement;

the components of said means for wirelessly communicating which are carried by the microphone-including arrangement are supported by the helmet of the rider;

the microphone-including arrangement including means for wirelessly transmitting the voice-carrying signals from the microphone-including arrangement; and the control unit includes means for receiving the voice-carrying signals transmitted wirelessly from the microphone-including arrangement, and the receiving means is connectable to one of the two-way radio or PA equipment for conductance thereto of the voice-carrying signals which are received by the receiving means;

the manually-operable switch mounted upon the handlebars is cooperable with the control unit so that by actuating the manually-operable switch, the voice-carrying signals received by the receiving means are conducted to one of the two-way radio or PA equipment for transmission or broadcast therefrom;

the control unit is connectable to the two-way radio for receiving the voice-carrying signals received thereby from a remote source and includes means for wirelessly transmitting the received voice-carrying signals from the control unit; and the microphone-including arrangement includes means for receiving the voice-carrying signals transmitted wirelessly from the control unit and at least one earphone through which the voice-carrying signals are emitted in the form of audible messages;

an electronic switch for enabling the signal-receiving capacity of the microphone-including arrangement from a disabled condition upon receipt of a wireless switching signal; and the control unit includes means for sending a wireless switching signal to the electronic switch of the microphone-including arrangement upon the occurrence of a predetermined event; and a switch associated with the kickstand which is adapted to sense the existence of a substantially non-vertical condition of the kickstand and is connected to the wireless switching signal-sending means of the control unit for sending a wireless switching signal to the electronic switch of the microphone-including arrangement when the kickstand is arranged in its substantially non-vertical condition.

19. A communication system for use by a helmeted rider of power sports equipment having handlebars about which the hands of the rider are positioned during operation of the power sports equipment and wherein there is carried by the power sports equipment both a two-way radio to which voice-carrying signals transmitted from the microphone-including arrangement can be delivered for transmission therefrom and public address (PA) equipment including a loudspeaker to which voice-carrying signals transmitted from the microphone-including arrangement can be delivered for broadcast from the loudspeaker thereof, the system comprising:

a microphone-including arrangement supported by the helmet of the rider for emitting voice-carrying signals, the microphone-including arrangement being operable in a talk mode during which voice messages spoken by the rider are received by the microphone of the microphone-including arrangement and transmitted from the microphone in the form of voice-carrying signals and a non-talk mode;

a control unit mountable upon the power sports equipment; including means for receiving the voice-carrying signals transmitted from the microphone; and the control unit and the microphone-including arrangement including means for wirelessly communicating with one another wherein the means for wirelessly communicating is comprised of a first set of components which is associated with the microphone-including arrangement and a second set of components which is associated with the control unit;

the first set of components of the means for wirelessly communicating being adapted to receive voice messages which are spoken by the rider into the microphone of the microphone-including arrangement to wirelessly transmit the voice messages in the form of voice-carrying signals and the microphone-including arrangement being operable in a talk mode during which messages which are spoken by the rider into the microphone of the microphone-including arrangement are wirelessly transmitted by the first set of components from the microphone-including arrangement and a non-talk mode;

the second set of components of the means for wirelessly communicating including means for capturing the voice-carrying signals which are transmitted wirelessly from the microphone-including arrangement during the talk mode of operation of the microphone-including arrangement;

a manually-operable switch being mountable upon the handlebars of the power sports equipment and connected to the control unit so that the rider can switch the microphone-including arrangement between the talk and the non-talk modes by way of the control unit as the rider's hands remain positioned about the handlebars of the power sports equipment; and the entirety of the first set of components of the means for wirelessly communicating is supported by the helmet of the rider so that removal of the helmet from the rider removes the entirety of the first set of components of the means for wirelessly communicating from the person of the rider;

the microphone-including arrangement includes means for wirelessly transmitting, when in its talk mode, the voice-carrying signals from the microphone-including arrangement;

the control unit includes a receiver for receiving the voice-carrying signals transmitted wirelessly from the microphone-including arrangement;

the receiver of the control unit is connectable to the two-way radio;

the manually-operable switch is a first switch and is connected to the control unit so that upon actuation of the first switch, the voice-carrying signals which are received by the receiver of the control unit are conducted to the two-way radio for transmission therefrom;

the receiver of the control unit is connectable to the PA equipment; and the system further includes a second manually-operable switch being mountable upon the handlebars of the power sports equipment and connected to the control unit so that upon actuation of the second switch, the voice-carrying signals which are received by the receiver of the control unit are conducted to the PA equipment for broadcast from the loudspeaker thereof.

20. A communication system for use by a helmeted rider of power sports equipment having handlebars about which the hands of the rider are positioned during operation of the power sports equipment and there is associated with the power sports equipment at least one of a two-way radio or public address (PA) equipment to which voice-carrying signals are desired to be conducted for transmission or broadcast therefrom and wherein the power sports equipment includes a kickstand for supporting the power sports equipment when the power sports equipment is not in operation and is pivotally movable relative to the remainder of the power sports equipment between a substantially vertical condition for supporting the power sports equipment as aforesaid and a non-vertical condition for storage of the kickstand, the system comprising:

a microphone-including arrangement supported by the helmet of the rider for emitting voice-carrying signals, the microphone-including arrangement being operable in a talk mode during which voice messages which are spoken by the rider are received by the microphone of the microphone-including arrangement and are transmitted from the microphone in the form of voice-carrying signals, and the microphone-including arrangement includes means for wirelessly transmitting the voice-carrying signals from the microphone-including arrangement; and a control unit mountable upon the power sports equipment and including means for receiving the voice-carrying signals transmitted wirelessly from the microphone-including arrangement, and the receiving means of the control unit is connectable to one of the radio or PA equipment for conductance thereto of the voice-carrying signals which are received by the receiving means of the control unit; and a manually-operable switch mounted upon the handlebars and connected to the control unit so that by actuating the manually-operable switch, the voice-carrying signals received by the receiving means of the second set of components of the means for wirelessly communicating are conducted to one of the radio or PA equipment for transmission or broadcast therefrom;

the control unit is connectable to the two-way radio for receiving the voice-carrying signals received thereby and includes means for wirelessly transmitting the received voice-carrying signals;

the microphone-including arrangement including a receiver for receiving the voice-carrying signals transmitted from the control unit; and the microphone-including arrangement further includes an electronic switch for enabling the receiver of the microphone-including arrangement from a disabled condition upon receipt of a wireless switching signal; and the control means include means for sending a wireless switching signal to the electronic switch of the microphone-including arrangement upon the occurrence of a predetermined event; and the system further includes a switch associated with the kickstand which is adapted to sense the existence of a substantially non-vertical condition of the kickstand and is connected to the wireless switching signal-sending means of tire control unit for sending a wireless switching signal to the electronic switch of the microphone-including arrangement when the kickstand is arranged in its substantially non-vertical condition.

21. The system as defined in claim 20 wherein there is carried by the power sports equipment both a two-way radio to which voice-carrying signals transmitted from the microphone-including arrangement can be delivered for transmission therefrom and public address (PA) equipment including a loudspeaker to which voice-carrying signals transmitted from the microphone-including arrangement can be delivered for broadcast from the loudspeaker thereof;

the microphone-including arrangement includes means for wirelessly transmitting, when in its talk mode, the voice-carrying signals from the microphone-including arrangement;

the control unit includes a receiver for receiving the voice-carrying signals transmitted wirelessly from the microphone-including arrangement;

the receiver of the control unit is connectable to the two-way radio;

the manually-operable switch is a first switch and is connected to the control unit so that upon actuation of the first switch, the voice-carrying signals which are received by the receiver of the control unit are conducted to the two-way radio for transmission therefrom;

the receiver of the control unit is connectable to the PA equipment; and the system further includes a second manually-operable switch being mountable upon the handlebars of the power sports equipment and connected to the control unit so that upon actuation of the second switch, the voice-carrying signals which are received by the receiver of the control unit are conducted to the PA equipment for broadcast from the loudspeaker thereof.

22. The system as defined in claim 21 wherein each of the first and second manually-operable switches includes a switch button which is supported for movement between an extended condition and a depressed condition and which is spring-biased from the depressed condition toward the extended condition so that either of the first or second manually-operable switches is actuated upon movement of its switch button from the extended condition to the depressed condition.

* * * * *